US007518852B2

(12) United States Patent
Kondas

(10) Patent No.: US 7,518,852 B2
(45) Date of Patent: Apr. 14, 2009

(54) POWER ENTRY ASSEMBLY FOR AN ELECTRICAL DISTRIBUTION SYSTEM

(75) Inventor: Shawn J. Kondas, Kendallville, IN (US)

(73) Assignee: Group Dekko, Inc., Kendallville, IN (US)

( * ) Notice: Subject to any disclaimer, the term of this patent is extended or adjusted under 35 U.S.C. 154(b) by 0 days.

(21) Appl. No.: 11/735,519

(22) Filed: Apr. 16, 2007

(65) Prior Publication Data

US 2007/0183122 A1 Aug. 9, 2007

Related U.S. Application Data

(63) Continuation of application No. 11/247,702, filed on Oct. 11, 2005.

(60) Provisional application No. 60/618,730, filed on Oct. 14, 2004.

(51) Int. Cl.
*H02B 1/26* (2006.01)
*H01R 13/58* (2006.01)
*H01B 7/00* (2006.01)

(52) U.S. Cl. ....................... 361/622; 439/456; 439/502; 174/113 R

(58) Field of Classification Search ................. 361/622; 174/112, 115, 113 R; 439/456, 502, 207, 439/211, 215
See application file for complete search history.

(56) References Cited

U.S. PATENT DOCUMENTS 1,967,021 A 7/1934 Gary
3,078,433 A 2/1963 Sheesley
3,551,879 A 12/1970 Waller
3,856,981 A * 12/1974 Boundy ...................... 174/491
4,060,294 A * 11/1977 Haworth et al. ............. 439/215
4,199,206 A * 4/1980 Haworth et al. ............... 439/31
4,278,834 A * 7/1981 Boundy ...................... 174/497
4,437,716 A * 3/1984 Cooper ........................ 439/31
4,579,403 A * 4/1986 Byrne ......................... 439/33
4,583,551 A 4/1986 Pike
4,593,960 A * 6/1986 Millhimes et al. ........... 439/140
4,688,869 A * 8/1987 Kelly ......................... 439/209
4,784,616 A 11/1988 Zimmermann
4,959,021 A * 9/1990 Byrne ........................ 439/310
5,041,002 A * 8/1991 Byrne ........................ 439/215
5,080,608 A 1/1992 Yarnton et al.
5,087,207 A * 2/1992 Byrne ........................ 439/215
5,096,431 A * 3/1992 Byrne ........................ 439/171
5,096,433 A * 3/1992 Boundy ...................... 439/215
5,096,434 A * 3/1992 Byrne ........................ 439/215
5,171,159 A * 12/1992 Byrne ........................ 439/215
5,186,640 A * 2/1993 McCoy ....................... 439/211
5,199,893 A 4/1993 Fussell
5,214,889 A * 6/1993 Nienhuis et al. ........... 52/220.7
5,382,179 A * 1/1995 Noschese .................... 439/533
5,605,473 A 2/1997 Kishon
5,941,720 A * 8/1999 Byrne ........................ 439/215
5,957,720 A 9/1999 Boudin ....................... 439/417

(Continued)

*Primary Examiner*—Jayprakash N Gandhi
*Assistant Examiner*—Bradley H Thomas
(74) *Attorney, Agent, or Firm*—Taylor & Aust, P.C.

(57) ABSTRACT

A power entry assembly for an electrical distribution system, the power entry assembly includes at least one conductor carrier and a housing connected to the at least one conductor carrier. The housing includes a first orientation relative to the at least one conductor carrier. A connector is connected to the housing at a second orientation, where the first orientation is approximately 180° from the second orientation.

18 Claims, 5 Drawing Sheets

U.S. PATENT DOCUMENTS

| | | | | |
|---|---|---|---|---|
| 5,964,610 | A * | 10/1999 | McCoy | 439/218 |
| 6,027,352 | A * | 2/2000 | Byrne | 439/215 |
| 6,050,840 | A * | 4/2000 | Kowalski et al. | 439/369 |
| 6,179,669 | B1 | 1/2001 | Chiang | 439/682 |
| 6,227,886 | B1 | 5/2001 | Baker et al. | |
| 6,305,947 | B1 | 10/2001 | Bruce | 439/63 |
| 6,336,826 | B1 | 1/2002 | Kraft | |
| 6,362,418 | B1 | 3/2002 | Grandy et al. | 174/36 |
| 6,457,988 | B1 | 10/2002 | Anderson | |
| 6,475,032 | B1 | 11/2002 | Dvorak | |
| 6,478,602 | B1 * | 11/2002 | Chapman et al. | 439/373 |
| 6,575,761 | B1 | 6/2003 | Regnier | 439/63 |
| D479,508 | S | 9/2003 | Chen et al. | D13/146 |
| 6,652,308 | B2 * | 11/2003 | Chapman et al. | 439/373 |
| 6,743,042 | B2 | 6/2004 | Kolle et al. | 439/417 |
| 6,910,903 | B2 * | 6/2005 | Kondas | 439/215 |
| 2002/0132506 | A1 * | 9/2002 | Wilson et al. | 439/207 |
| 2003/0133259 | A1 | 7/2003 | Meyer et al. | 361/677 |
| 2004/0009702 | A1 | 1/2004 | Potega | 439/578 |
| 2005/0130476 | A1 * | 6/2005 | Kochanski | 439/215 |

* cited by examiner

POWER ENTRY ASSEMBLY FOR AN ELECTRICAL DISTRIBUTION SYSTEM

CROSS REFERENCE TO RELATED APPLICATIONS

This is a continuation of U.S. patent application Ser. No. 11/247,702, entitled "POWER ENTRY ASSEMBLY FOR AN ELECTRICAL DISTRIBUTION SYSTEM", filed Oct. 11, 2005, which is incorporated by reference herein. U.S. patent application Ser. No. 11/247,702 is a non-provisional application based upon U.S. provisional patent application Ser. No. 60/618,730, entitled "POWER ENTRY", filed Oct. 14, 2004, which is incorporated by reference herein.

BACKGROUND OF THE INVENTION

1. Field of the Invention

The present invention relates to an electrical distribution system, and, more particularly, to a power entry assembly for an electrical distribution system.

2. Description of the Related Art

Conventional electrical distribution systems include a power service entry into a circuit breaker or fuse box, and then distribution of conductors from the circuit breaker or fuse box to electrical receptacles, lights, electrical machinery, and the like. In the case of commercial buildings, and in other situations, the conductors may be routed through an exposed ceiling, or walls, to be connected to lighting, and/or dropped to a lower level to connect into power receptacles or electrical controls which are easily accessible by a user, for example. Such ceiling and other conductors may be required to be enclosed within conduit. The process then involves installing the conduit, pulling the conductor circuits through the conduit, and then connecting the conductors to appropriate circuit breaker or fuses within the electrical box. Further, if multiple lights are connected to a given circuit, for example, junction boxes may be required where branch conductors, going to individual lights for example, are connected to the circuit. This process can be time consuming and expensive, as it generally requires highly skilled installation personnel. Further, add-on modifications to the system typically requires that additional conduit be installed, and conductors pulled therethrough to installed junction boxes, then the conductors finally connected to the add-on electrical appliance, outlet, etc. Additionally, such an installation can be somewhat dangerous in that it requires the installation personnel to stand on ladders in the case of overhead wiring, or the like, and perform a multitude of tedious operations.

An electrical distribution system can be envisioned which includes one or more prefabricated distribution harnesses each with multiple connectors, and where branch circuits are connected into a distribution harness by simply connecting a mating connector to a respective harness connector. However, elements must be provided to originally bring power to the distribution harness. A power entry box can be connected to alternating current (AC) and direct current (DC) electrical conductors; however, electrical connection must be made between the power entry box and the distribution harness.

One of the problems associated with making electrical connection between the power entry box and the distribution harness is that the electrical distribution system may be an overhead system in which the connection is not easily made. Further, the power entry harness connector of the distribution harness may be configured in such a way that it is below the power entry box. Yet further, the power entry harness connector of the distribution harness may have its access at least partially obscured by structural components which hold the distribution harness, thereby requiring a "blind" connection to the distribution harness by the installation personnel.

What is needed in the art is a power entry assembly which can easily and cost effectively provide both AC and DC interconnection between a power entry box and a distribution harness of an electrical distribution system.

SUMMARY OF THE INVENTION

The present invention provides a power entry assembly which easily and cost effectively provides both AC and DC interconnection between a power entry box and a distribution harness of an electrical distribution system.

The invention comprises, in one form thereof, an electrical distribution system, which includes an electrical distribution harness having an electrical distribution connector, and a power entry assembly connected to the electrical distribution connector. The power entry assembly includes at least one conductor carrier and a housing connected to the at least one conductor carrier. The housing has a first orientation relative to the at least one conductor carrier. A connector is connected to the housing at a second orientation. The first orientation is approximately 180° from the second orientation. The connector is connected to the electrical distribution connector.

The invention comprises, in another form thereof, a power entry assembly for an electrical distribution system, the power entry assembly includes at least one conductor carrier and a housing connected to the at least one conductor carrier. The housing includes a first orientation relative to the at least one conductor carrier. A connector is connected to the housing at a second orientation, where the first orientation is approximately 180° from the second orientation.

The invention comprises, in yet another form thereof, a method of assembling a power entry assembly, including the steps of: connecting at least one conductor carrier to a housing at a first orientation; attaching a connector to the housing at a second orientation, the first orientation being approximately 180° from the second orientation.

An advantage of the present invention is that it provides a power entry assembly which easily and cost effectively provides both AC and DC interconnection between a power entry box and a distribution harness of an electrical distribution system.

Another advantage of the present invention is that it is configured for connection to the power entry harness connector of the distribution harness.

Yet another advantage of the present invention is that it is configured for a "blind" connection to the power entry harness connector of the distribution harness.

Yet another advantage of the present invention is that it has two different conductor carriers, one for AC conductors and one for DC conductors.

Yet another advantage of the present invention is that the two different conductor carriers have different outside textures which are tactile discernibly different, which allows an installer to correctly orient the power entry assembly relative to the distribution harness by feel alone (i.e., without visual contact).

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
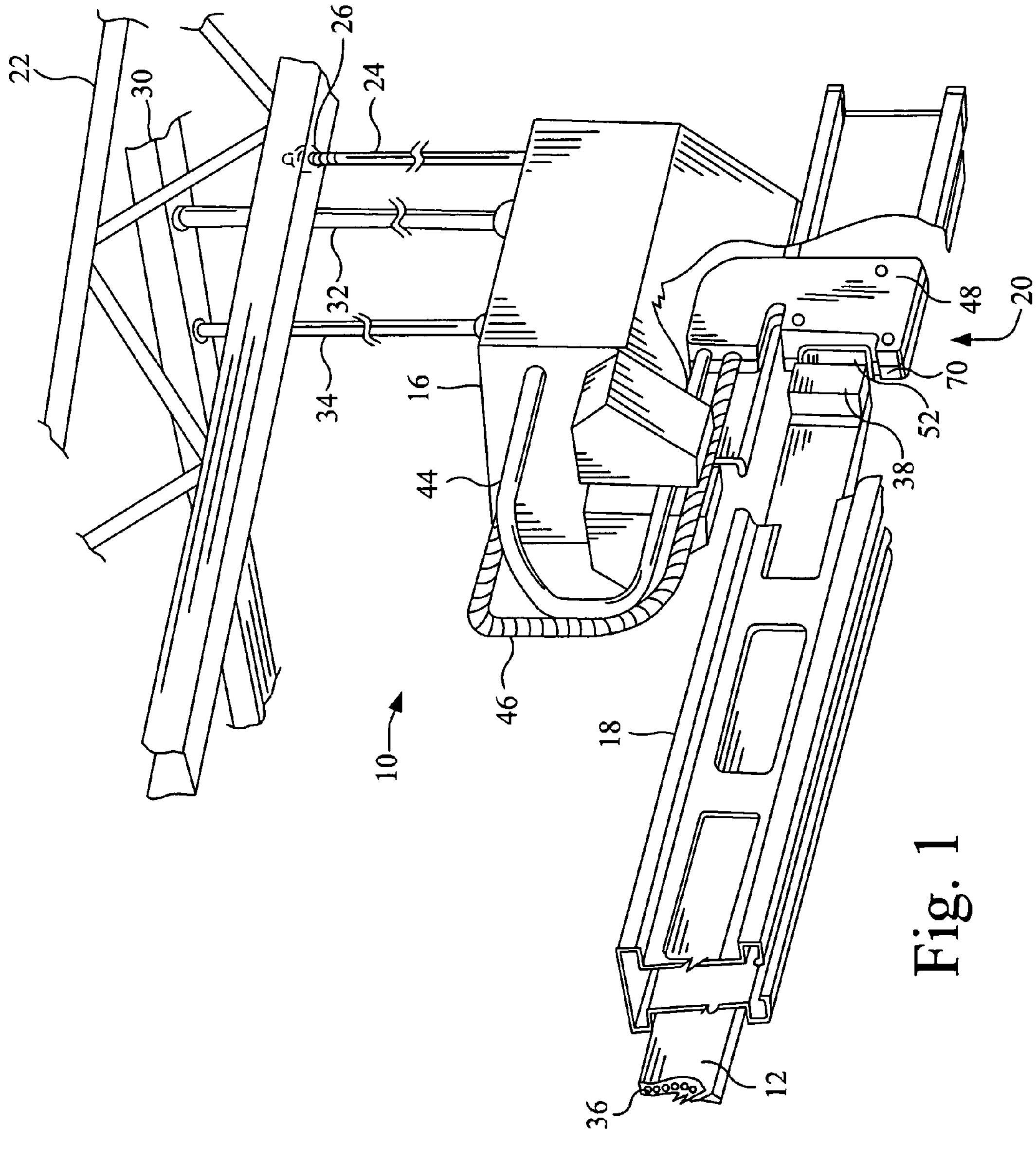
FIG. 1 is a fragmentary perspective view of an embodiment of an electrical distribution system according to the present invention.

Referring now to the drawings, and more particularly to FIG. 1, there is shown an electrical distribution system 10 which generally includes an electrical distribution harness 12, a power entry box 16, a structural element 18 and a power entry assembly 20.

Figure 2:
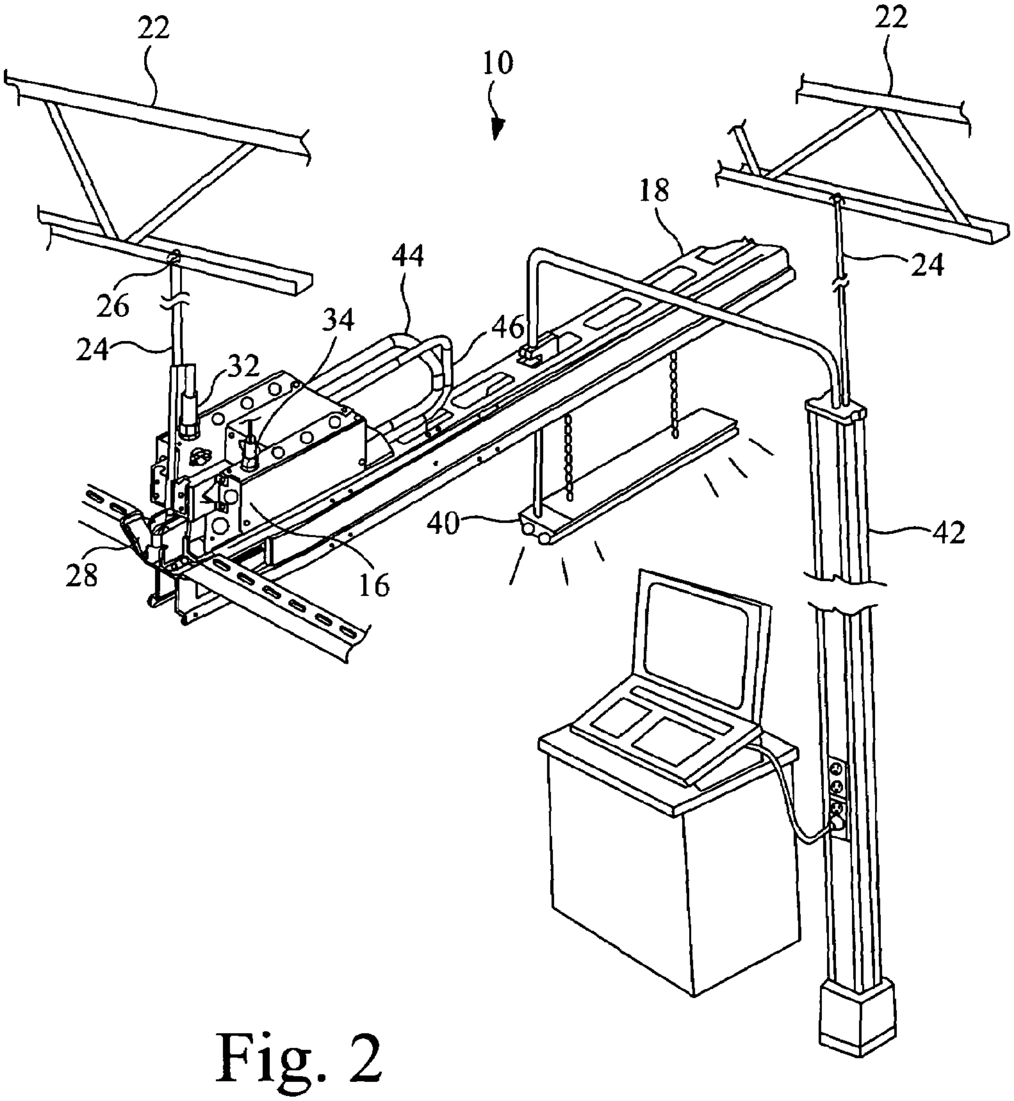
FIG. 2 is a fragmentary perspective view of the electrical distribution system of FIG. 1, shown in conjunction with a light fixture, power post and other end use systems.
Figure 3:
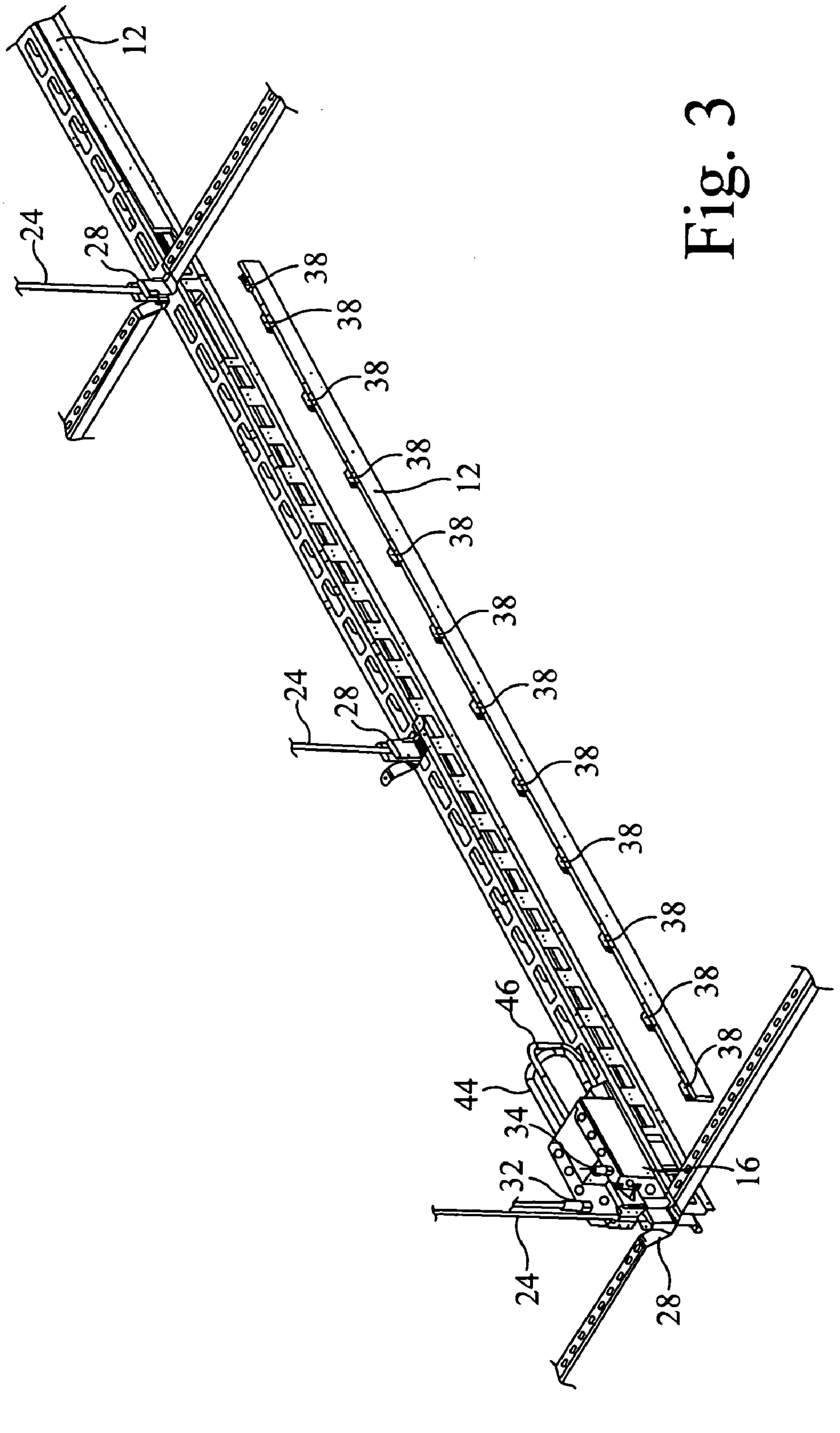
FIG. 3 is a fragmentary perspective view of the electrical distribution system of FIG. 1, shown with the distribution harness exploded from the structural element.

Structural element 18 can be attached to, and supported by, a ceiling joist 22 via threaded rods 24, fasteners 26 and hangers 28 (FIGS. 2 and 3). Raceway 30 can include AC and DC conductors (not shown), and other conductors or cables, which are passed through respective AC conduit 32 and DC conduit 34 to power entry box 16. Power entry box 16 is mounted to structural element 18. Power entry box 16 can have suitable internal elements such as bus bars, circuit boards, control elements, etc., to facilitate the routing and control of the AC and DC circuits from respective AC conduit 32 and DC conduit 34.

Electrical distribution harness 12 can include harness conductors 36 which can comprise either AC and/or DC circuits, or other circuits such as data circuits. For example, harness conductors 36 can include three line conductors (12 gauge wire), one ground conductor (12 gauge wire) and one neutral conductor (10 gauge wire), and DC conductors as required which may typically include 14 or 12 gauge conductors. Electrical distribution harness 12 includes at least one, and typically a plurality of, electrical distribution connectors 38. Electrical terminals within electrical distribution connector 38 are connected to respective harness conductors 36. Electrical distribution harness 12 can include suitable barriers to separate AC terminals and AC harness conductors 36, from DC terminals and DC harness conductors 36, respectively. Electrical distribution harness 12 can be mounted on either side of structural element 18, but may typically be mounted on one side. As shown in FIG. 2, a variety of electrical elements such as a light 40 and a power post 42 can then easily be connected to electrical distribution harness 12 by connection to a respective electrical distribution connector 38.

Power entry assembly 20 electrically interconnects electrical distribution connector 38 and power entry box 16. Power entry assembly 20 includes at least one conductor carrier 44, 46, and a housing 48 connected to at least one conductor carrier 44, 46. Housing 48 includes a first orientation 50 relative to at least one conductor carrier 44, 46. A connector 52 is connected to housing 48 at a second orientation 54, where first orientation 50 is approximately 180° from second orientation 54. That is, the terminals 56 (FIG. 4) of connector 52 are faced in approximately the opposite direction as which at least one conductor carriers 44, 46 enters housing 48. Connector 52 is connected to electrical distribution connector 38. AC conductors 58 and DC conductors 60 are connected to respective terminals 56, which connect with respective terminals (not shown) in electrical distribution connector 38, and the terminals of electrical distribution connector 38 are connected to respective harness conductors 36. AC conductors 58 and DC conductors 60, and corresponding conductor carriers 44, 46 can also connected to power entry box 16.

Conductor carrier 44 can include a first outside texture 62 and conductor carrier 46 can include a second outside texture 64, where first outside texture 62 is tactile discernibly different than second outside texture 64. For example, conductor carrier 44 can be a relatively smooth oval cross-section and conductor carrier 46 can be a convoluted cross-section. Alternating current conductors 58 can be carried in conductor carrier 44 and direct current conductors 60 can be carried in conductor carrier 46.

Figure 4:
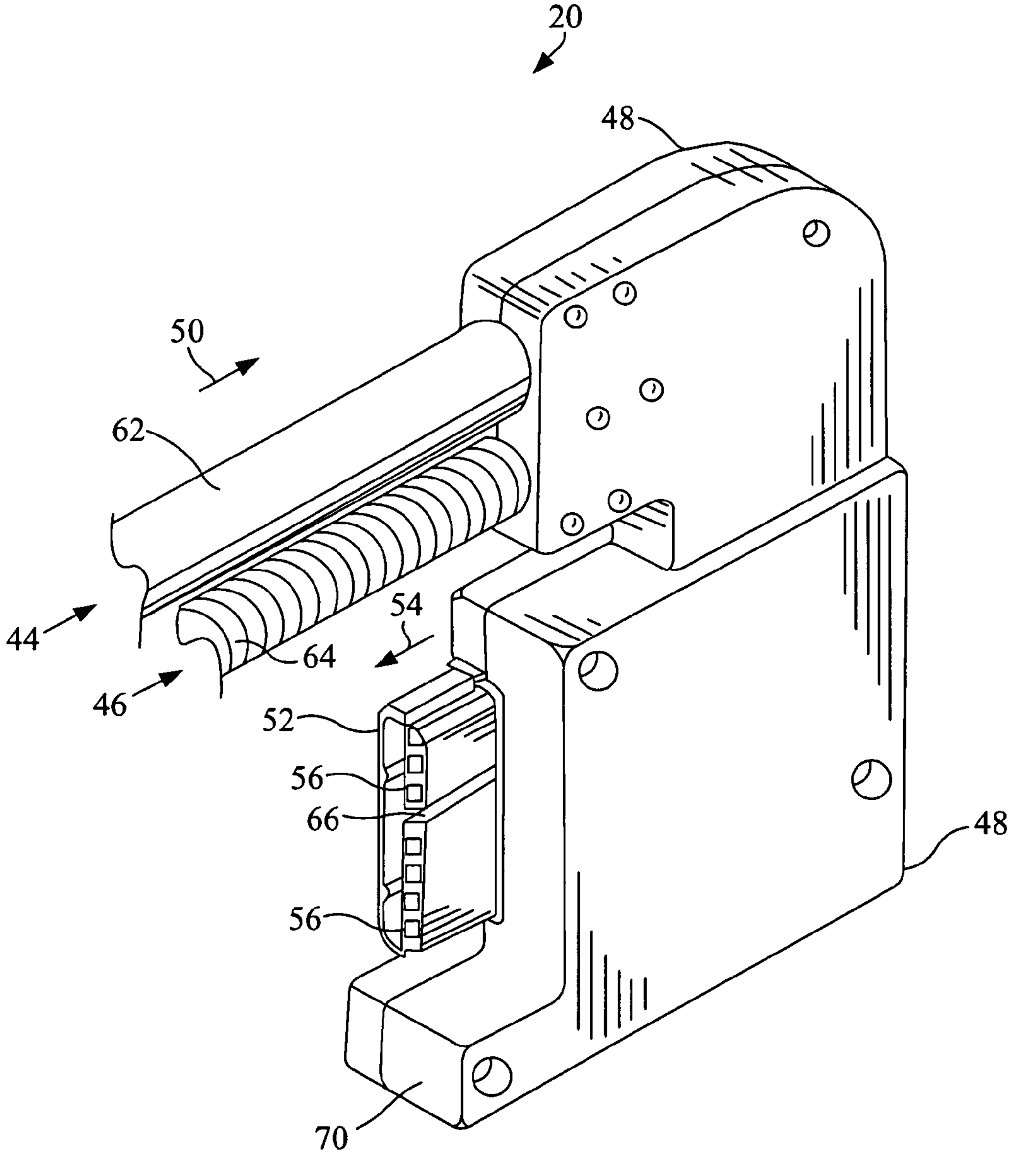
FIG. 4 is a fragmentary perspective view of an embodiment of a power entry assembly according to the present invention.
Figure 5:
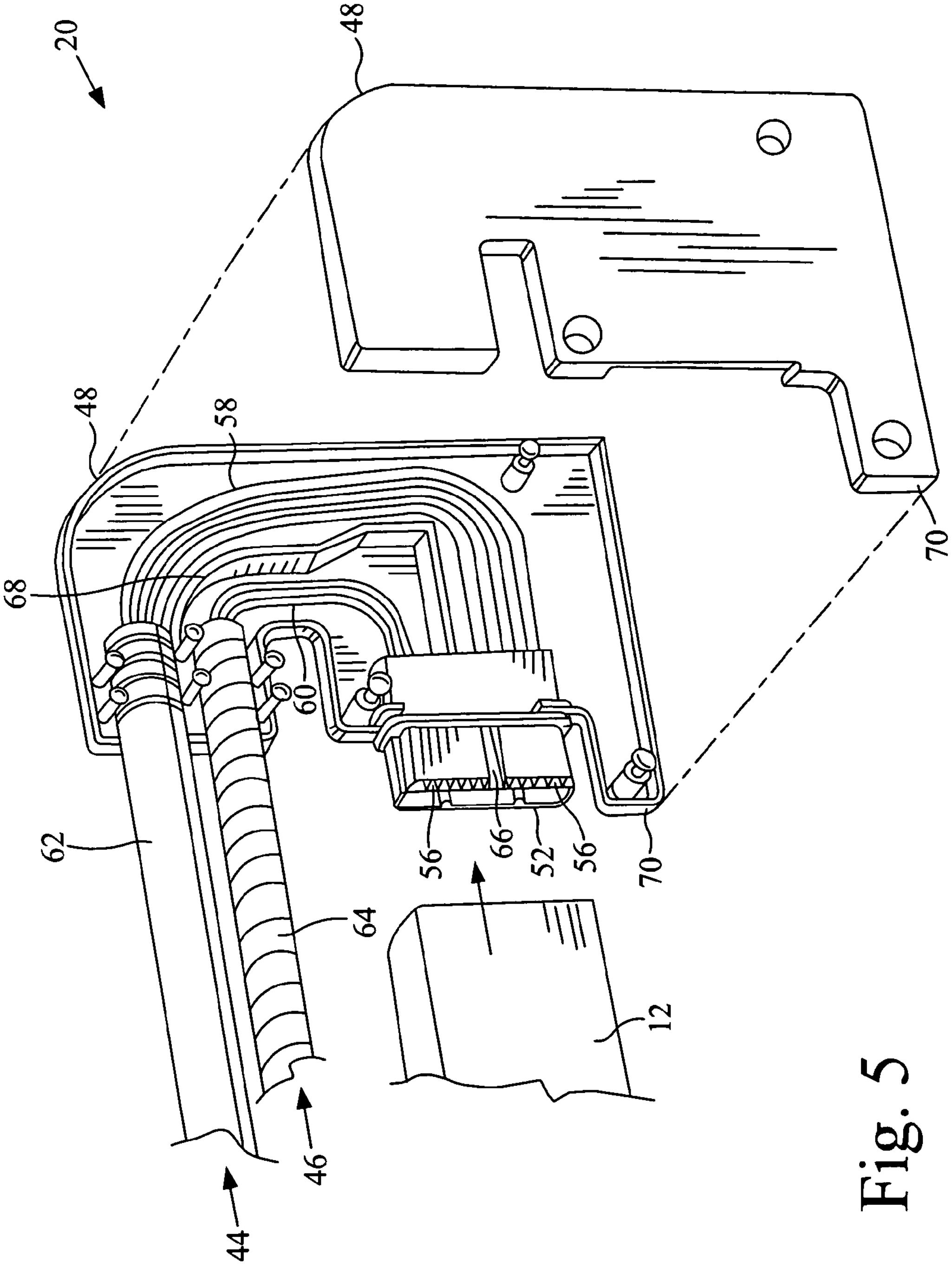
FIG. 5 is an exploded fragmentary perspective view of the power entry assembly of FIG. 1.

Connector 52 includes AC terminals 56 (lower as shown in FIGS. 4 and 5) connected to alternating current conductors 58, and DC terminals 56 (upper as shown in FIGS. 4 and 5) connected to direct current conductors 60, and connector 52 includes a connector barrier 66 separating the AC and DC terminals. Housing 48 includes a housing barrier 68 separating alternating current conductors 58 and direct current conductors 60. Housing 48 can also include a guide 70 adjacent connector 52 which helps facilitate the alignment of, and "blind" connection of, connector 52 relative to electrical distribution connector 38, along with the texture of conductor carriers 44, 46 and the orientation of connector 52.

In use, the present invention discloses a method of assembling power entry assembly 20, comprising the steps of: connecting at least one conductor carrier 44, 46 to housing 48 at first orientation 50; and attaching connector 52 to housing 48 at second orientation 54, where first orientation 50 is approximately 180° from second orientation 54.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical distribution system, comprising:

an electrical distribution harness including an electrical distribution connector;

a power entry assembly connected to said electrical distribution connector, said power entry assembly including:

at least two conductor carriers each carrying respectively a plurality of conductors;

a housing connected to said conductor carriers, said housing including a first orientation relative to said conductor carriers;

a connector connected to said housing at a second orientation, said first orientation approximately 180° from said second orientation, said connector including a plurality of terminals facing in approximately an opposite direction as which said conductor carriers connect to said housing, said connector directly connected to said electrical distribution connector, said conductors entering said housing, one said plurality of conductors being a plurality of direct current conductors, another said plurality of conductors being a plurality of alternating current conductors, said plurality of direct current conductors entering said housing separate from said plurality of alternating current conductors as said plurality of direct current conductors and said plurality of alternating current conductors enter said housing, said housing including a housing barrier which maintains said plurality of direct current conductors separate from said plurality of alternating current conductors.

2. The electrical distribution system of claim 1, wherein said housing includes a guide adjacent said connector and spaced apart from said electrical distribution connector, said guide configured for facilitating alignment and blind connection of said connector relative to said electrical distribution connector, said guide forming a projection on said housing and being spaced apart from said connector.

3. The electrical distribution system of claim 1, wherein said plurality of terminals face in approximately an opposite direction as which said conductor carriers enter said housing.

4. The electrical distribution system of claim 1, wherein said housing is directly connected to said conductor carriers.

5. The electrical distribution system of claim 1, wherein said housing has a generally U-shaped cross section, said connector of said power entry assembly including a housing which is fastened to said housing of said power entry assembly and which projects in part from said housing of said power entry assembly.

6. The electrical distribution system of claim 1, further including a power entry box, said power entry assembly electrically interconnecting said power entry box and said electrical distribution harness.

7. The electrical distribution system of claim 1, said connector is removably connected to said electrical distribution connector.

8. A power entry assembly for an electrical distribution system, said power entry assembly comprising:

at least two conductor carriers configured for directly connecting to a power entry box, said at least two conductor carriers each carrying respectively a plurality of conductors;

a housing connected to said conductor carriers, said housing including a first orientation relative to said conductor carriers;

a connector connected to said housing at a second orientation, said first orientation approximately 180° from said second orientation, said connector including a plurality of terminals facing in approximately an opposite direction as which said conductor carriers connect to said housing, said connector configured for directly connecting to an electrical distribution connector of an electrical distribution harness, said conductors entering said housing, one said plurality of conductors being a plurality of direct current conductors, another said plurality of conductors being a plurality of alternating current conductors, said plurality of direct current conductors entering said housing separate from said plurality of alternating current conductors as said plurality of direct current conductors and said plurality of alternating current conductors enter said housing, said housing including a housing barrier which maintains said plurality of direct current conductors separate from said plurality of alternating current conductors.

9. The power entry assembly of claim 8, wherein said housing includes a guide adjacent said connector, said guide configured for facilitating alignment and blind connection of said connector relative to said electrical distribution connector, said guide forming a projection on said housing and being spaced apart from said connector.

10. The power entry assembly of claim 8, wherein said plurality of terminals face in approximately an opposite direction as which said conductor carriers enter said housing.

11. The power entry assembly of claim 8, wherein said housing is directly connected to said conductor carriers.

12. The power entry assembly of claim 8, wherein said housing has a generally U-shaped cross section, said connector of the power entry assembly including a housing which is fastened to said housing of the power entry assembly and which projects in part from said housing of the power entry assembly.

13. The power entry assembly of claim 8, said connector is configured for being removably connected to said electrical distribution connector.

14. A method of assembling a power entry assembly, comprising the steps of:

connecting at least two conductor carriers to a housing at a first orientation, said conductor carriers configured for directly connecting to a power entry box, said at least two conductor carriers each carrying respectively a plurality of conductors; and attaching a connector to said housing at a second orientation, said first orientation approximately 180° from said second orientation, said connector including a plurality of terminals facing in approximately an opposite direction as which said conductor carriers connect to said housing, said connector configured for directly connecting to an electrical distribution connector of an electrical distribution harness, said conductors entering said housing, one said plurality of conductors being a plurality of direct current conductors, another said plurality of conductors being a plurality of alternating current conductors, said plurality of direct current conductors entering said housing separate from said plurality of alternating current conductors as said plurality of direct current conductors and said plurality of alternating current conductors enter said housing, said housing including a housing barrier which maintains said plurality of direct current conductors separate from said plurality of alternating current conductors.

15. The method of assembling a power entry assembly of claim 14, wherein plurality of terminals face in approximately an opposite direction as which said conductor carriers enter said housing.

16. The method of assembling a power entry assembly of claim 14, wherein said housing is directly connected to said conductor carriers.

17. The method of assembling a power entry assembly of claim 14, wherein said housing has a generally U-shaped cross section, said connector of the power entry assembly including a housing which is fastened to said housing of the power entry assembly and which projects in part from said housing of the power entry assembly.

18. The method of claim 14, said connector is configured for being removably connected to said electrical distribution connector, said housing including a guide adjacent said connector, said guide configured for facilitating alignment and blind connection of said connector relative to said electrical distribution connector, said guide forming a projection on said housing and being spaced apart from said connector.

* * * * *